US010650076B2

(12) United States Patent
Yang

(10) Patent No.: US 10,650,076 B2
(45) Date of Patent: May 12, 2020

(54) SYSTEM FOR DETERMINING PLACEMENT PARAMETERS FOR A MEDIA CONTENT

(71) Applicant: Tencent Technology (Shenzhen) Company Limited, Shenzhen, Guangdong (CN)

(72) Inventor: Xiwang Yang, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 240 days.

(21) Appl. No.: 15/711,999

(22) Filed: Sep. 21, 2017

(65) Prior Publication Data
US 2018/0011864 A1      Jan. 11, 2018

Related U.S. Application Data

(63) Continuation of application No. PCT/CN2016/079216, filed on Apr. 13, 2016.

(30) Foreign Application Priority Data

Dec. 30, 2015 (CN) .......................... 2015 1 1027976

(51) Int. Cl.
*H01H 13/70* (2006.01)
*H03K 17/94* (2006.01)
(Continued)

(52) U.S. Cl.
CPC .......... *G06F 16/958* (2019.01); *G06F 16/438* (2019.01); *G06F 3/048* (2013.01);
(Continued)

(58) Field of Classification Search
CPC .............................. G06F 16/958; G06F 16/438
(Continued)

(56) References Cited

U.S. PATENT DOCUMENTS

2004/0267806 A1*   12/2004   Lester ................... G06Q 30/02
2008/0010337 A1*    1/2008   Hayes ................... G06Q 10/00
                                                                709/202
(Continued)

FOREIGN PATENT DOCUMENTS

CN           1860496 A       11/2006
CN         102077182 A        5/2011
(Continued)

OTHER PUBLICATIONS

Second Chinese Office Action, issued in China Application No. 201511027976.9, dated Jan. 11, 2019, pp. 1-9, Chinese Patent Office, Beijing, China.
(Continued)

*Primary Examiner* — Cesar B Paula
*Assistant Examiner* — Luu-Phuong T Nguyen
(74) *Attorney, Agent, or Firm* — Brinks Gilson & Lione

(57) ABSTRACT

A media content placement system is provided. The system may determine a first parameter corresponding to a media object of a plurality of media objects displayed according to a presentation sequence, the first parameter based on a predetermined quantity of times a media object is displayed. The system may determine a second parameter corresponding to the media object, the second placement parameter may be based on of a positive feedback for the media object. The system may determine a third parameter corresponding to the media object, the third parameter may be based on a negative feedback for the media object. The system may determine a presentation index corresponding to a media object. The presentation index may reference a position in a presentation sequence used to display media objects. The system may determine the presentation index based on the first parameter, the second parameter and the third parameter.

20 Claims, 7 Drawing Sheets

(51) Int. Cl.
*H03M 11/00* (2006.01)
*G06F 16/958* (2019.01)
*G06F 16/438* (2019.01)
*G06F 3/0488* (2013.01)
*G06F 3/048* (2013.01)
*G06Q 50/00* (2012.01)
*H04L 29/08* (2006.01)

(52) U.S. Cl.
CPC ......... *G06F 3/04883* (2013.01); *G06Q 50/01* (2013.01); *H04L 67/02* (2013.01); *H04L 67/36* (2013.01)

(58) Field of Classification Search
USPC ........................................................ 715/200
See application file for complete search history.

(56) References Cited

U.S. PATENT DOCUMENTS

| | | | |
|---|---|---|---|
| 2008/0275757 A1 | 11/2008 | Sharma et al. | |
| 2009/0217178 A1* | 8/2009 | Niyogi | G06Q 10/00 715/753 |
| 2009/0248672 A1* | 10/2009 | McIntire | G06F 16/41 |
| 2010/0287033 A1* | 11/2010 | Mathur | G06Q 50/01 705/319 |
| 2013/0073546 A1* | 3/2013 | Yan | G06F 16/9535 707/732 |
| 2013/0212479 A1* | 8/2013 | Willis | G06Q 10/10 715/736 |
| 2014/0188593 A1 | 7/2014 | Sun | |
| 2015/0019325 A1 | 1/2015 | Li et al. | |
| 2015/0242513 A1* | 8/2015 | Sanghavi | G06F 16/9535 707/734 |
| 2016/0099856 A1* | 4/2016 | Ramaswamy | H04L 43/106 707/748 |
| 2016/0294894 A1* | 10/2016 | Miller | G06F 16/24578 |
| 2017/0161273 A1* | 6/2017 | Cao | G06F 16/435 |

FOREIGN PATENT DOCUMENTS

| | | |
|---|---|---|
| CN | 102088626 A | 6/2011 |
| CN | 102811207 A | 12/2012 |
| CN | 103150663 A | 6/2013 |
| CN | 103207876 A | 7/2013 |
| CN | 103295147 A | 9/2013 |
| CN | 103914468 A | 7/2014 |

OTHER PUBLICATIONS

International Search Report with English translation, dated Sep. 26, 2016, pp. 1-4, issued in International Patent Application No. PCT/CN2016/079216, State Intellectual Property Office of the P.R. China, Beijing, China.

Office Action dated May 3, 2018 for Chinese Application No. 201511027976.9, 10 pages.

* cited by examiner

SYSTEM FOR DETERMINING PLACEMENT PARAMETERS FOR A MEDIA CONTENT

RELATED APPLICATION

This application is a continuation of International Application PCT/CN2016/079216, filed Apr. 13, 2016, which claims priority to Chinese Patent Application No. 201511027976.9, entitled "MEDIA INFORMATION PRESENTATION METHOD, SERVER, CLIENT, AND COMPUTER STORAGE MEDIUM", filed on Dec. 30, 2015, both of which are incorporated herein by reference in their entirety.

FIELD OF THE TECHNOLOGY

The present disclosure relates to information processing technologies, and in particular, to a media information presentation method, a server, a client, and a computer storage medium.

BACKGROUND OF THE DISCLOSURE

When presenting media information on a content page, such as a web site, information may be arranged according to various industry metrics that indicate a likelihood that the media information may will viewed. Present approaches to the media placement of the media information fail to efficiently account for attributes and interactions specific to a user viewing the media information and other users socially connected with the user. Moreover, present approaches to displaying media information in social media suffer from a variety of drawbacks, limitations, disadvantages, and inefficiencies. There is a need for the inventive concepts described herein.

SUMMARY

Embodiments of the present disclosure may provide at least one of a media information presentation method, a server, a client, and a computer storage medium.

A media information presentation method provided in an embodiment includes:

obtaining a first parameter, a second parameter, and a third parameter of each media information, the first parameter being used for characterizing that a preset quantity of times of presenting the media information is associated, the second parameter being used for characterizing that a first-type interaction operation on the media information is associated, the third parameter being used for characterizing that a second-type interaction operation on the media information is associated, and a behavior attribute that characterizes the first-type interaction operation being contrary to a behavior attribute that characterizes the second-type interaction operation;

obtaining, according to the first parameter, the second parameter, and the third parameter of each media information, a fourth parameter that is of each media information and that is used for characterizing a presentation index of the media information; and determining a presentation sequence of each media information according to the fourth parameter of each media information.

A media information presentation method provided in another embodiment includes:

presenting, on a display interface, each media information according to a presentation sequence indicated by a fourth parameter of each media information, where the fourth parameter is obtained according to a first parameter, a second parameter, and a third parameter, the first parameter being used for characterizing that a preset quantity of times of presenting the media information is associated, the second parameter being used for characterizing that a first-type interaction operation on the media information is associated, the third parameter being used for characterizing that a second-type interaction operation on the media information is associated, and a behavior attribute that characterizes the first-type interaction operation being contrary to a behavior attribute that characterizes the second-type interaction operation.

A server provided in an embodiment includes:

a processor, configured to perform the following operations by using executable instructions: obtaining a first parameter, a second parameter, and a third parameter of each media information, the first parameter being used for characterizing that a preset quantity of times of presenting the media information is associated, the second parameter being used for characterizing that a first-type interaction operation on the media information is associated, the third parameter being used for characterizing that a second-type interaction operation on the media information is associated, and a behavior attribute that characterizes the first-type interaction operation being contrary to a behavior attribute that characterizes the second-type interaction operation; obtaining, according to the first parameter, the second parameter, and the third parameter of each media information, a fourth parameter that is of each media information and that is used for characterizing a presentation index of the media information; and determining a presentation sequence of each media information according to the fourth parameter of each media information.

A client provided in an embodiment includes:

a display, configured to present, on a display interface, each media information according to a presentation sequence indicated by a fourth parameter of each media information, where the fourth parameter is obtained according to a first parameter, a second parameter, and a third parameter, the first parameter being used for characterizing that a preset quantity of times of presenting the media information is associated, the second parameter being used for characterizing that a first-type interaction operation on the media information is associated, the third parameter being used for characterizing that a second-type interaction operation on the media information is associated, and a behavior attribute that characterizes the first-type interaction operation being contrary to a behavior attribute that characterizes the second-type interaction operation.

A computer program is stored in a computer storage medium provided in an embodiment, and the computer program is used for executing the media information presentation method.

In the technical solutions in the embodiments, a first parameter, a second parameter, and a third parameter of each media information, are obtained, where the first parameter is used for characterizing that a preset quantity of times of presenting the media information is associated, the second parameter is used for characterizing that a first-type interaction operation on the media information is associated, the third parameter is used for characterizing that a second-type interaction operation on the media information is associated, and a behavior attribute that characterizes the first-type interaction operation being contrary to a behavior attribute that characterizes the second-type interaction operation. Herein, the first parameter is specifically an ECPM, and represents a value of a media information placement user; the second parameter represents interaction experience of a social user on the media information; and the third parameter is negative feedback on the media information, and represents a loss of a social platform image value. A fourth parameter that is of each media information and that is used for characterizing a presentation index of the media information is obtained according to the first parameter, the second parameter, and the third parameter of each media information. A presentation sequence of each media information is determined according to the fourth parameter of each media information. It can be seen that, in the embodiments, the presentation sequence of each media information is determined by comprehensively considering the value of the media information placement user, the interaction experience of the social user on the media information, and the loss of the social platform image value. The presentation sequence of the media information is not only related to the value of the media information placement user, but also related to the interaction experience of the social user on the media information, and the loss of the social platform image value. Therefore, the media information presented according to the presentation sequence in the embodiments is more accurate for a user.

DESCRIPTION OF EMBODIMENTS

For characteristics and technical content of embodiments to be known in a more detailed manner, the following describes implementation of the embodiments in detail with reference to the accompanying drawings. The provided accompanying drawings are for reference and description, and are not intended to limit the embodiments.

The following is description of key terms in the embodiments.

ECPM(u,ad): a first parameter, representing costs for a user u to present media information ad for one thousand times.

EE(u,ad): a first interaction value, representing interaction values of all interaction operations performed on the media information ad by the first user u.

$W_e(u)$: a first conversion coefficient, used for converting a first interaction value into a unit that is consistent with the first parameter.

E(v, ad): representing an interaction probability that is of a second user v associated with the first user u and that is for the media information.

coeff(u,v): representing a value of association between the first user u and a second user v.

auth(v): representing an attribute value of authority of the second user.

social_E(E, ad): a second interaction value, representing an interaction value that is of the second user v associated with the first user u and that is for the media information.

$W_e(u)$: a fourth conversion coefficient, used for converting a second interaction value into a unit that is consistent with the first parameter.

ENFBR(u,ad): representing a ratio of negative feedback of the social user u on the media information ad.

$bid_{xout}(u,ad)$: a third conversion coefficient, representing a value of a penalty for the social user u being not interested in the media information ad.

In a process of implementing technical solutions in embodiments of this disclosure, an inventor of this application discovers that a related technology has at least the following technical problem:

Information presented in social media is referred to as an information stream. When presenting information, the social media should comprehensively consider problems of information placement user, social user, social diffusion, social platform image, and the like.

Using an example in which presented information is an advertisement, an advertisement is usually presented in a bidding advertising manner. Bidding advertising uses an estimated cost per mille (ECPM, Estimated Cost Per Mille) as an advertisement sorting index, and this manner considers benefits of an advertiser. However, when an advertisement is presented in the social media, the advertisement should become a portion of friend dynamics of a social media user. Therefore, advertisement experience of a social user needs to be fully considered. In a related technology, there is no effective solution for how to presenting an advertisement by comprehensively considering advertisement experience of a social user.

Embodiment 1

Figure 1:
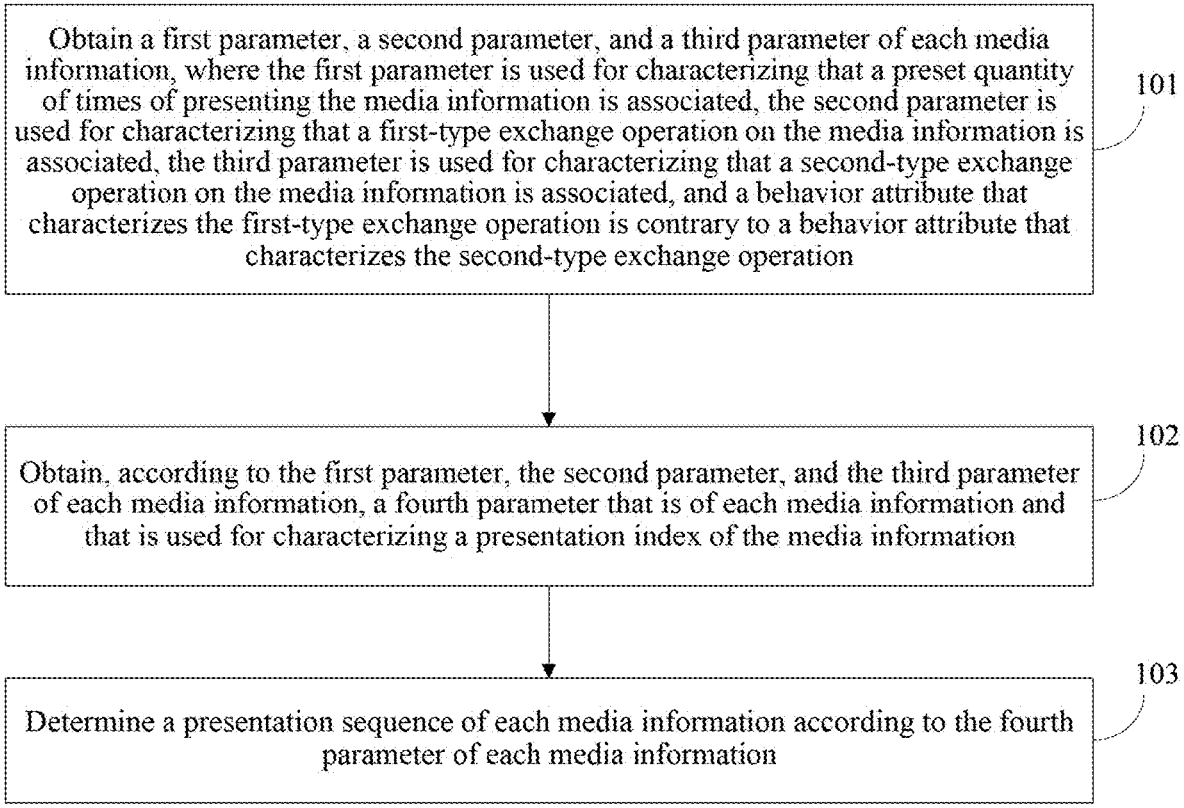
FIG. 1 is a schematic flowchart of a media information presentation method according to Embodiment 1.

An embodiment provides a media information presentation method. The media information presentation method in this example is applied to a server side. As shown in FIG. 1, the media information presentation method includes the following steps.

Step 101: Obtain a first parameter, a second parameter, and a third parameter of each media information, where the first parameter is used for characterizing that a preset quantity of times of presenting the media information is associated, the second parameter is used for characterizing that a first-type interaction operation on the media information is associated, the third parameter is used for characterizing that a second-type interaction operation on the media information is associated, and a behavior attribute that characterizes the first-type interaction operation is contrary to a behavior attribute that characterizes the second-type interaction operation.

In this embodiment, the media information may one of or any combination of the following information: picture, text, video, audio, and the like.

The technical solution in this embodiment applies to various social media, such as a blog or microblog. By using the social media, a user may view dynamic information of a friend user of the user. The media information in question such as an advertisement in this embodiment is integrated into the dynamic information of the friend user. Media information in friend dynamics in the social media is referred to as a information stream.

In this embodiment, the first-type interaction operation has a first behavior attribute, the second-type interaction operation has a second behavior attribute, and the first behavior attribute is contrary to the second behavior attribute. A positive feedback operation such as following, sharing, or commenting on media information is defined as having the first behavior attribute. A negative feedback operation such as deleting or unfollowing media information is defined as having the second behavior attribute. The first behavior attribute indicates that a social user is interested in the media information. The second behavior attribute indicates that a social user is not interested in the media information. In other words, a negative feedback interaction operation may be associated with a negative feedback attribute. The negative feedback attribute may include an identifier associated with a first group of interaction operations. The first group of interaction operations may be previously classified with a predetermined sentiment representative of disinterest and/or negative interaction. Alternatively or in addition, a positive feedback interaction operation may be associated with a positive feedback attribute. The positive feedback attribute may include an identifier associated with a second group of interaction operations. The second group of interaction operations may be previously classified with a predetermined sentiment representative of interest and/or positive interaction.

The first parameter and/or a first placement metric is associated with the preset quantity of times of presenting the media information, and represents a value of a media information placement user. In an implementation, the first parameter may be an ECPM. The ECPM refers to estimated revenue that can be obtained from presenting media information for every one thousand times. The unit for presenting the media information may be a web page, a media information unit, or the like. By default, the ECPM refers to revenue of presenting a web page (Pageview) for one thousand times. In some examples, a first placement metric may be an example of the first parameter. In Step 101, the logic may include an operation to determine a first placement metric corresponding to a media object of a plurality of media objects. The first placement metric may be based on a predetermined number of times a media object is displayed.

The second parameter and/or a second placement metric is associated with the first-type interaction operation performed on the media information, and represents interaction experience of a social user on the media information. Herein, the first-type interaction operation includes: more than one interaction operation performed on the media information by a first user, and more than one interaction operation performed on the media information by a second user associated with the first user. Specifically, the first user refers to a user that currently registers with and logs in to social media, and the second user refers to a friend that the first user adds or follows. The interaction operation triggered by the first user on the media information includes a clicking operation, an operation of giving a thumb-up, a commenting operation, a forwarding operation, a following operation, or the like. The interaction operation triggered by the second user on the media information includes a clicking operation, an operation of giving a thumb-up, a commenting operation, a forwarding operation, a following operation, or the like. When media information is exposed to a first user, if a second user has triggered an interaction operation on the media information, interaction information of the second user is displayed in this exposure. This exposure is referred to as social diffusion exposure. The behavior attribute of the first-type interaction operation is the first behavior attribute. The first behavior attribute indicates that social users (the first user and the second user) are interested in the media information. In some examples, the second placement metric may be an example of the second parameter. In Step 101, the logic may include an operation to determine a second placement metric corresponding to the media object. The second placement metric may be determined based on a first-type interaction operation with the media object. The first-type interaction operation may be associated with a positive feedback attribute.

The third parameter and/or a third placement metric is associated with the second-type interaction operation performed on the media information. The third parameter is negative feedback on the media information, and represents a loss of a social platform image value. When media information is presented to a social user, the social user triggers, on the media information, an interaction operation indicating no interest, for example, a refusal operation or a shielding operation. Then, the media information immediately disappears from dynamics of the social user, such as a friend circle. A behavior attribute of the second-type interaction operation is the second behavior attribute. The second behavior attribute indicates that social users (the first user and the second user) are not interested in the media information. It can be seen that, the behavior attribute that characterizes the first-type interaction operation is contrary to the behavior attribute that characterizes the second-type interaction operation. In some examples, the second placement parameter may be an example the second parameter. In Step 101, the logic may include an operation to determine a third placement metric corresponding to the media object. The third placement metric may be determined based on a second-type interaction operation with the media object. The second-type interaction operation may be associated with a negative feedback attribute.

Step 102: Obtain, according to the first parameter, the second parameter, and the third parameter of each media information, a fourth parameter that is of each media information and that is used for characterizing a presentation index of the media information.

In this embodiment, the fourth parameter is used for characterizing the presentation index of the media information. Calculation of the fourth parameter relates to the first parameter, the second parameter, and the third parameter. It can be seen that, by means of the fourth parameter, the value of the media information placement user, the interaction experience of the social user on the media information, and the loss of the social platform image value are comprehensively considered, and then the presentation sequence of each media information is determined.

Step 103: Determine a presentation sequence of each media information according to the fourth parameter of each media information.

In this embodiment, a value of the fourth parameter is related to the presentation sequence of each media information. Specifically, a larger fourth parameter indicates a higher presentation sequence of media information. On the contrary, a smaller fourth parameter indicates a lower presentation sequence of media information. The presentation sequence of the media information determines a presentation position of the media information. A higher presentation sequence indicates a more visible presentation position. Setting of a presentation position is flexibly adjusted according to a specific website page. When media information is located at a visible location of the presentation position, a social user is easier to pay attention to the media information.

In the embodiments, the presentation sequence of each media information is determined by comprehensively considering the value of the media information placement user, the interaction experience of the social user on the media information, and the loss of the social platform image value. The presentation sequence of the media information is not only related to the value of the media information placement user, but also related to the interaction experience of the social user on the media information, and the loss of the social platform image value. Therefore, the media information presented according to the presentation sequence in the embodiments is more accurate for a user. In some examples, the Step 103 may include an operation to determining a presentation index corresponding to a media object. The presentation index may reference a position in a presentation sequence. The presentation sequence may describe a sequential order in which to display media objects. The presentation index may be determined based on a weighted combination of the first placement metric, the second placement metric, and the third placement metric. Alternatively or in addition, the Step 103 may include an operation to communicate to a display interface, an instruction to display the media objects according to the presentation sequence.

Embodiment 2

Figure 2:
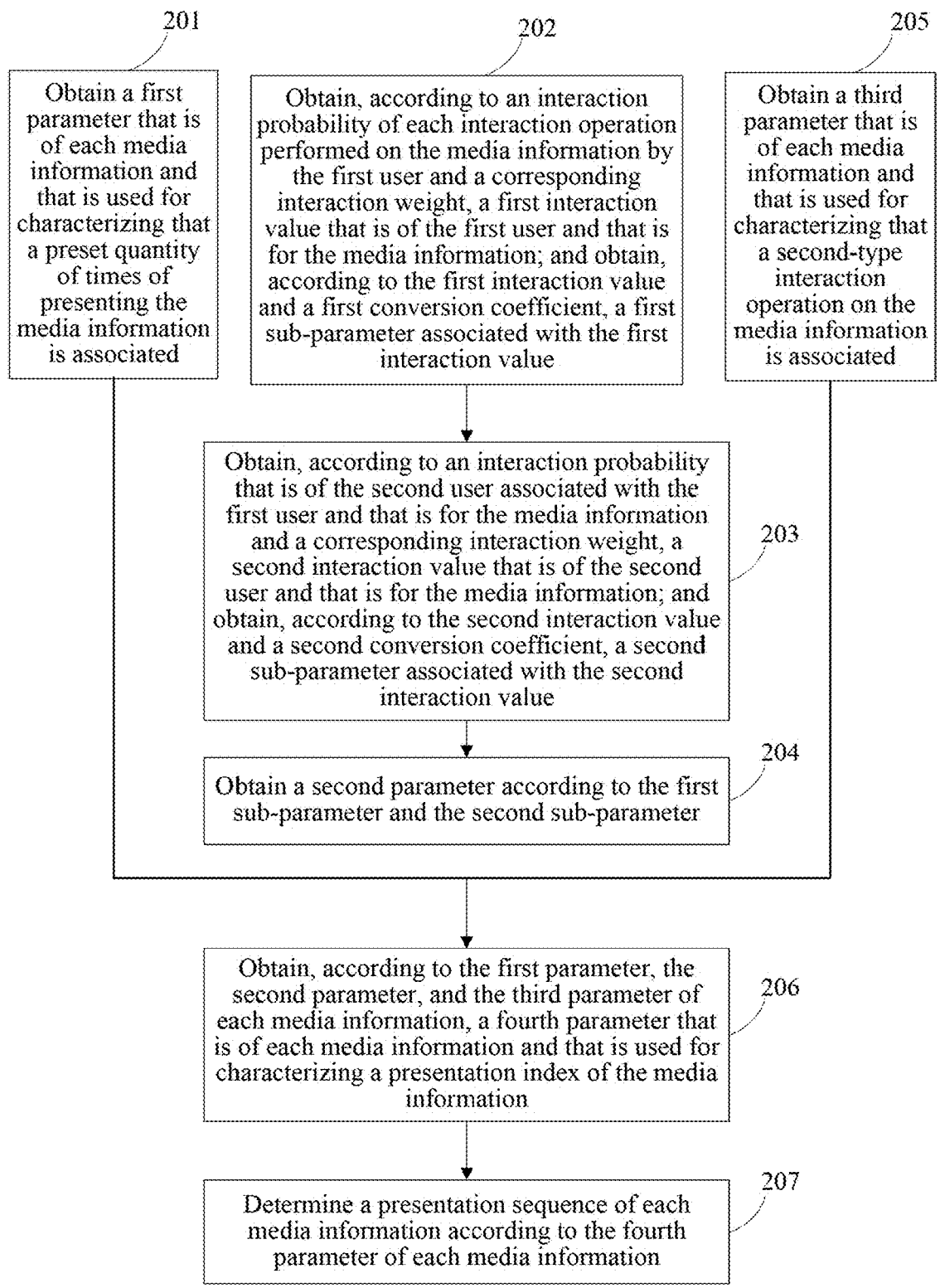
FIG. 2 is a schematic flowchart of a media information presentation method according to Embodiment 2.

An embodiment provides a media information presentation method. The media information presentation method in this example is applied to a server side. As shown in FIG. 2, the media information presentation method includes the following steps.

Step 201: Obtain a first parameter that is of each media information and that is used for characterizing that a preset quantity of times of presenting the media information is associated.

In this embodiment, the media information may one of or any combination of the following information: picture, text, video, audio, and the like.

The technical solution in this embodiment applies to various social media, such as a blog and/or a microblog. By using the social media, a user may view dynamic information of a friend user of the user. The media information in question such as an advertisement in this embodiment is integrated into the dynamic information of the friend user. Media information in friend dynamics in the social media is referred to as a information stream.

The first parameter is associated with a preset quantity of times of presenting the media information, and represents a value of a media information placement user. In an implementation, the first parameter may be an ECPM. The ECPM refers to estimated revenue that can be obtained from presenting media information for every one thousand times. The unit for presenting the media information may be a web page, a media information unit, or the like. By default, the ECPM refers to revenue of presenting a web page for one thousand times.

In this embodiment, the second parameter that is of each media information and that is used for characterizing that a first-type interaction operation on the media information is associated is further obtained. For details, refer to the following steps in this embodiment. The second parameter is associated with the first-type interaction operation performed on the media information, and represents interaction experience of a social user on the media information. Herein, the first-type interaction operation includes: more than one interaction operation performed on the media information by a first user, and more than one interaction operation performed on the media information by a second user associated with the first user. Specifically, the first user refers to a user that currently registers with and logs in to social media, and the second user refers to a friend that the first user adds or follows. The interaction operation triggered by the first user on the media information includes a clicking operation, an operation of giving a thumb-up, a commenting operation, a forwarding operation, a following operation, or the like. The interaction operation triggered by the second user on the media information includes a clicking operation, an operation of giving a thumb-up, a commenting operation, a forwarding operation, a following operation, or the like. When media information is exposed to a first user, if a second user has triggered an interaction operation on the media information, interaction information of the second user is displayed in this exposure. This exposure is referred to as social diffusion exposure. The behavior attribute of the first-type interaction operation is the first behavior attribute. The first behavior attribute indicates that social users (the first user and the second user) are interested in the media information.

Step 202: Obtain, according to an interaction probability of each interaction operation performed on the media information by the first user and a corresponding interaction weight, a first interaction value that is of the first user and that is for the media information; and obtain, according to the first interaction value and a first conversion coefficient, a first sub-parameter associated with the first interaction value. For example, the step 202 may include operations to determine respective interaction probabilities for each of the interaction operations performed under a first account.

In this embodiment, each interaction operation in more than one interaction operation performed on the media information by the first user corresponds to an interaction weight. The first interaction value that is of the first user and that is for the media information may be obtained by performing linear weighting on the interaction probability of each interaction operation in the more than one interaction operation performed on the media information by the first user and the corresponding interaction weight. For example, the step 202 may further include an operation to select respective interaction weights for each of the interaction operations performed under the first account. In addition, the step 202 may include an operation to apply the respective interaction weights with the respective interaction probabilities to determine a plurality of weighted interaction probabilities. The step 202 may further include an operation to combine the weighted interaction probabilities to generate a first interaction value.

In this embodiment, the first conversion coefficient may be used for converting a first interaction value into a unit, such as cost, that is consistent with the first parameter. In some examples, the step 202 may include an operation to normalize the first interaction value with a first conversion coefficient. The normalization may result in a first sub-parameter.

Step 203: Obtain, according to an interaction probability that is of the second user associated with the first user and that is for the media information and a corresponding interaction weight, a second interaction value that is of the second user and that is for the media information; and obtain, according to the second interaction value and a second conversion coefficient, a second sub-parameter associated with the second interaction value.

For example, the step 203 may include operations to determining respective interaction probabilities for each of the interaction operations performed under a second account.

In this embodiment, the interaction probability that is of the second user and that is for the media information corresponds to one interaction weight. The second interaction value that is of the second user associated with the first user and that is for the media information may be obtained by performing linear weighting on an interaction probability of each second user and an interaction weight. For example, the step 203 may further include an operation to select respective interaction weights for each of the interaction operations performed under the second account. In addition, the step 203 may include an operation to apply the respective interaction weights with the respective interaction probabilities to determine a plurality of weighted interaction probabilities. The step 203 may further include an operation to combine the weighted interaction probabilities to generate a second interaction value.

In this embodiment, the second conversion coefficient is used for converting a second interaction value into a unit, such as cost, that is consistent with the first parameter. In some examples, the step 203 may include an operation to normalize the second interaction value with a second conversion coefficient. The normalization may result in a second sub-parameter Step 204: Obtain a second parameter and/or a second placement metric according to the first sub-parameter and the second sub-parameter. For example, the second placement metric may be determined based on the first sub-parameter, the second sub parameter, and/or a combination of the first sub-parameter and the second sub-parameter.

In this embodiment, the second parameter is obtained by adding the first sub-parameter and the second sub-parameter together.

Step 205: Obtain a third parameter that is of each media information and that is used for characterizing that a second-type interaction operation on the media information is associated.

In this embodiment, the third parameter is associated with the second-type interaction operation performed on the media information. The third parameter is negative feedback on the media information, and represents a loss of a social platform image value. When media information is presented to a social user, the social user triggers, on the media information, an interaction operation indicating no interest, for example, a refusal operation or a shielding operation. Then, the media information immediately disappears from dynamics of the social user, such as a friend circle. A behavior attribute of the second-type interaction operation is the second behavior attribute. The second behavior attribute indicates that social users (the first user and the second user) are not interested in the media information. It can be seen that, the behavior attribute that characterizes the first-type interaction operation is contrary to the behavior attribute that characterizes the second-type interaction operation. In some examples, the Step 205 may include an operation to determine a negative feedback ratio of the media object according to the negative feedback interaction operation. Alternatively or in addition, the Step 205 may include and operation to determine the third placement parameter, based on the negative feedback ratio and a conversion coefficient.

Step 206: Obtain, according to the first parameter, the second parameter, and the third parameter of each media information, a fourth parameter that is of each media information and that is used for characterizing a presentation index of the media information.

In this embodiment, the fourth parameter is used for characterizing the presentation index of the media information. Calculation of the fourth parameter relates to the first parameter, the second parameter, and the third parameter. It can be seen that, by means of the fourth parameter, the value of the media information placement user, the interaction experience of the social user on the media information, and the loss of the social platform image value are comprehensively considered, and then the presentation sequence of each media information is determined.

In some examples, the step 206 may include an operation to determine a presentation index corresponding to a media object. The presentation index may reference a position in a presentation sequence. The presentation sequence may describe a sequential order in which to display media objects. The presentation index may comprising a weighted combination of the first placement metric, the second placement metric, and/or the third placement metric. The step 206 may further include an operation to communicate, to a display interface, an instruction to display the media objects according to the presentation sequence.

Step 207: Determine a presentation sequence of each media information according to the fourth parameter of each media information.

In this embodiment, a value of the fourth parameter is related to the presentation sequence of each media information. Specifically, a larger fourth parameter indicates a higher presentation sequence of media information. On the contrary, a smaller fourth parameter indicates a lower presentation sequence of media information. The presentation sequence of the media information determines a presentation position of the media information. A higher presentation sequence indicates a more visible presentation position. Setting of a presentation position is flexibly adjusted according to a specific website page. When media information is located at a visible location of the presentation position, a social user is easier to pay attention to the media information.

In the embodiments, the presentation sequence of each media information is determined by comprehensively considering the value of the media information placement user, the interaction experience of the social user on the media information, and the loss of the social platform image value. The presentation sequence of the media information is not only related to the value of the media information placement user, but also related to the interaction experience of the social user on the media information, and the loss of the social platform image value. Therefore, the media information presented according to the presentation sequence in the embodiments is more accurate for a user.

Embodiment 3

Figure 3:
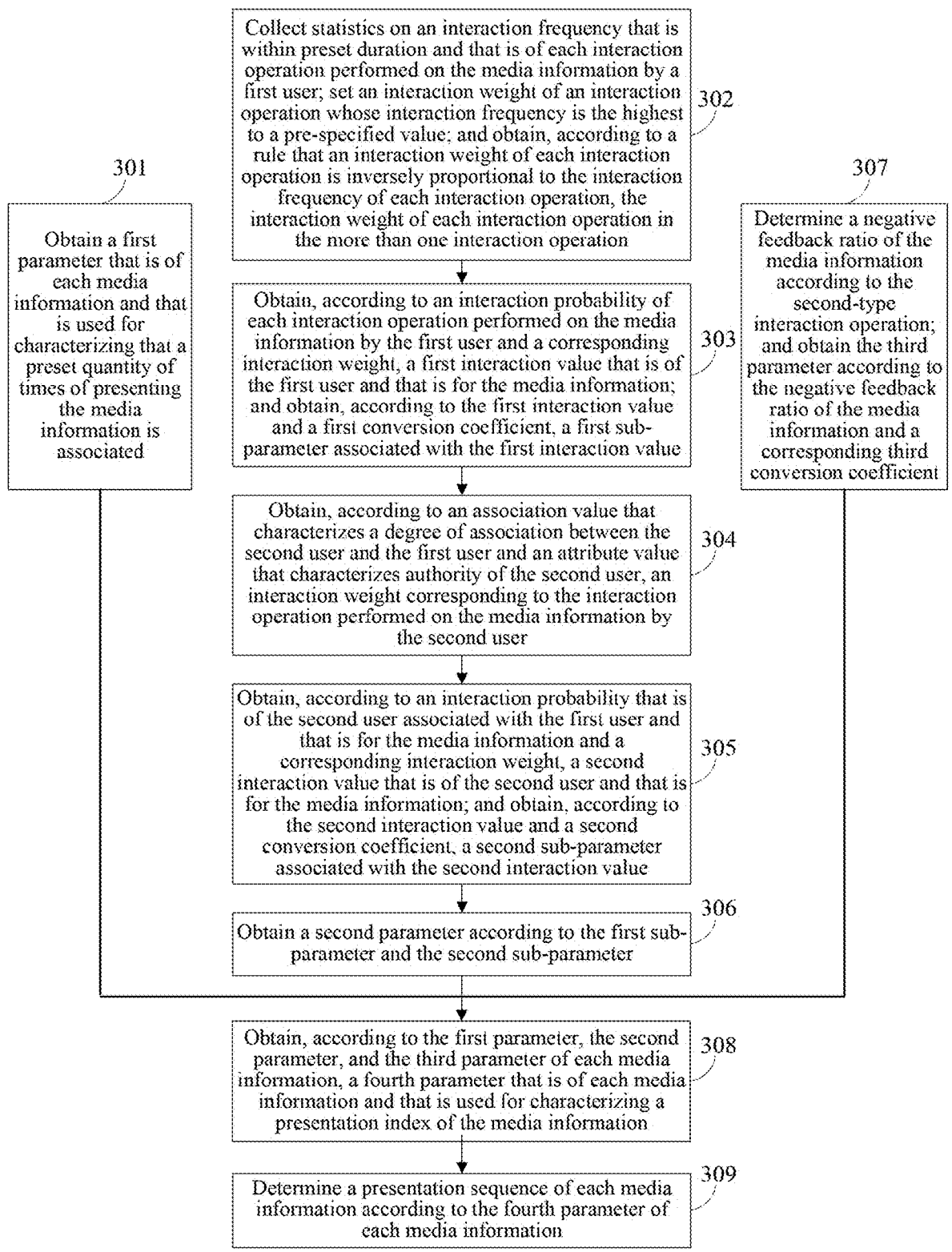
FIG. 3 is a schematic flowchart of a media information presentation method according to Embodiment 3.

An embodiment provides a media information presentation method. The media information presentation method in this example is applied to a server side. As shown in FIG. 3, the media information presentation method includes the following steps.

Step 301: Obtain a first parameter that is of each media information and that is used for characterizing that a preset quantity of times of presenting the media information is associated.

In this embodiment, the media information may one of or any combination of the following information: picture, text, video, audio, and the like.

The technical solution in this embodiment applies to various social media, such as Facebook, blog, and microblog. By using the social media, a user may view dynamic information of a friend user of the user. The media information in question such as an advertisement in this embodiment is integrated into the dynamic information of the friend user. Media information in friend dynamics in the social media is referred to as a information stream.

The first parameter is associated with a preset quantity of times of presenting the media information, and represents a value of a media information placement user. In an implementation, the first parameter may be an ECPM. The ECPM refers to estimated revenue that can be obtained from presenting media information for every one thousand times. The unit for presenting the media information may be a web page, a media information unit, or the like. By default, the ECPM refers to revenue of presenting a web page for one thousand times.

In this embodiment, the first parameter is expressed as an ECPM(u,ad), and represents costs for a user u to present media information ad for one thousand times.

In this embodiment, the second parameter that is of each media information and that is used for characterizing that a first-type interaction operation on the media information is associated is further obtained. For details, refer to the following steps in this embodiment. The second parameter is associated with the first-type interaction operation performed on the media information, and represents interaction experience of a social user on the media information. Herein, the first-type interaction operation includes: more than one interaction operation performed on the media information by a first user, and more than one interaction operation performed on the media information by a second user associated with the first user. Specifically, the first user refers to a user that currently registers with and logs in to social media, and the second user refers to a friend that the first user adds or follows. The interaction operation triggered by the first user on the media information includes a clicking operation, an operation of giving a thumb-up, a commenting operation, a forwarding operation, a following operation, or the like. The interaction operation triggered by the second user on the media information includes a clicking operation, an operation of giving a thumb-up, a commenting operation, a forwarding operation, a following operation, or the like. When media information is exposed to a first user, if a second user has triggered an interaction operation on the media information, interaction information of the second user is displayed in this exposure. This exposure is referred to as social diffusion exposure. The behavior attribute of the first-type interaction operation is the first behavior attribute. The first behavior attribute indicates that social users (the first user and the second user) are interested in the media information.

Step 302: Collect statistics on an interaction frequency that is within preset duration and that is of each interaction operation performed on the media information by a first user; set an interaction weight of an interaction operation whose interaction frequency is the highest to a pre-specified value; and obtain, according to a rule that an interaction weight of each interaction operation is inversely proportional to the interaction frequency of each interaction operation, the interaction weight of each interaction operation in the more than one interaction operation.

In some examples, the step 302 may include an operation to calculate, according to a rule associated with one or more interaction operation, an interaction weight corresponding to a interaction operation. The interaction operation may be performed by a first account. The interaction weight based an amount of interaction between the first account and a second account linked with the first account. The step 302 may include an operation to weight, with the interaction weight, an interaction probability corresponding to the first-type interaction operation.

In this embodiment, the interaction weight of each interaction operation in the more than one interaction operation performed on the media information by the first user may be analyzed according to history statistical data based on an idea that a rarer interaction operation (whose interaction probability is lower) indicates a higher weight. In an implementation, for a to-be-monitored interaction operation, statistics on an interaction frequency within a latest period of time is collected. An interaction weight of an interaction operation whose frequency is the highest is set to a unit 1. An interaction weight of another interaction operation is calculated according to that an interaction weight of an interaction operation is inversely proportional to an interaction frequency of the interaction operation.

Based on the foregoing method, the interaction weight of each interaction operation in the more than one interaction operation performed on the media information by the first user is determined, and additionally, some rules may be added to revise the interaction weight. For example, these rules are: a commenting operation can reflect more interest of a social user in media information than an operation of giving a thumb-up can, and therefore an interaction weight of the commenting operation is correspondingly adjusted to be higher, and an interaction weight of the operation of giving a thumb-up is correspondingly adjusted to be lower. For another example, an operation of giving a thumb-up can reflect more interest of a social user in media information than an avatar clicking operation or a nickname clicking operation can, importance of the avatar clicking operation is equivalent to importance of the nickname clicking operation, and so on. Based on this, a server receives a revised value for the interaction weight of each interaction operation in the more than one interaction operation performed on the media information by the first user, and revises the interaction weight of each interaction operation, thereby implementing dynamic adjustment of a social weight, and flexibly controlling a presentation sequence of the media information.

Step 303: Obtain, according to an interaction probability of each interaction operation performed on the media information by the first user and a corresponding interaction weight, a first interaction value that is of the first user and that is for the media information; and obtain, according to the first interaction value and a first conversion coefficient, a first sub-parameter associated with the first interaction value.

In this embodiment, each interaction operation in more than one interaction operation performed on the media information by the first user corresponds to one interaction weight. The first interaction value that is of the first user and that is for the media information may be obtained by performing linear weighting on the interaction probability of each interaction operation in the more than one interaction operation performed on the media information by the first user and the corresponding interaction weight.

In this embodiment, the first conversion coefficient is used for converting a first interaction value into a unit, such as cost, that is consistent with the first parameter.

In this embodiment, an interaction probability of an interaction operation is expressed as that represents an interaction probability of an interaction operation i performed by the first user. An corresponding interaction weight is expressed as $w_i$. Then, the first interaction value EE(u,ad) is:

$$EE(u, ad) = \sum_{i=1}^{N} w_i \times AR_i(u, ad)$$

In this embodiment, the first conversion coefficient is expressed as $w_e(u)$. Then, the first sub-parameter is:

$w_e(u) \times EE(u, ad)$

Step 304: Obtain, according to an association value that characterizes a degree of association between the second user and the first user and an attribute value that characterizes authority of the second user, an interaction weight corresponding to the interaction operation performed on the media information by the second user.

In this embodiment, the interaction probability that is of the second user and that is for the media information corresponds to one interaction weight. The second interaction value that is of the second user associated with the first user and that is for the media information may be obtained by performing linear weighting on an interaction probability of each second user and an interaction weight.

Specifically, the association value that characterizes the degree of association between the second user and the first user represents intimacy between the second user and the first user, and may be measured by using a record of contact between the second user and the first user, or may be set by a user. The attribute value that characterize the second user authority represents credibility of the second user, and the authority of the second user may be measured in a manner of certification by a network platform.

The interaction weight corresponding to the interaction operation performed on the media information by the second user may be obtained by adding the association value that characterizes a degree of association between the second user and the first user and the attribute value that characterizes the authority of the second user together.

In this embodiment, an association value is expressed as coeff(u,v) that represents an association value between a first user u and a second user v. The attribute value of the authority of the second user is expressed as auth(v). Value ranges of coeff(u,v) and auth(v) are from 0 to 1. Then, the interaction weight corresponding to the interaction operation is coeff(u,v)+auth(v).

Step 305: Obtain, according to an interaction probability that is of the second user associated with the first user and that is for the media information and a corresponding interaction weight, a second interaction value that is of the second user and that is for the media information; and obtain, according to the second interaction value and a second conversion coefficient, a second sub-parameter associated with the second interaction value.

In this embodiment, the second interaction value that is of the second user and that is for the media information may be obtained by performing linear weighting on the interaction probability that is of the second user and that is for the media information and a corresponding interaction weight.

In this embodiment, the second conversion coefficient is used for converting a second interaction value into a unit, such as cost, that is consistent with the first parameter.

In this embodiment, the interaction probability that is of the second user and d) that is for the media information is expressed as E(v,ad). Then, the second interaction value social_E(u,ad) is:

$$\text{social\_E}(u, ad) = \sum_{v \in F_u} (coeff(u, v) + auth(v)) \times E(v, ad)$$

where, Fu indicates a set of friends (second users) of the first user u.

Step 306: Obtain a second parameter according to the first sub-parameter and the second sub-parameter.

In this embodiment, the second parameter is obtained by adding the first sub-parameter and the second sub-parameter together.

Specifically, the second parameter is:

$w_e(u) \times EE(u, ad) + w_s(u) \times \text{social\_E}(u, ad)$

Step 307: Determine a negative feedback ratio of the media information according to the second-type interaction operation; and obtain the third parameter according to the negative feedback ratio of the media information and a corresponding third conversion coefficient.

In this embodiment, the third parameter is associated with the second-type interaction operation performed on the media information. The third parameter is negative feedback on the media information, and represents a loss of a social platform image value. When media information is presented to a social user, the social user triggers, on the media information, an interaction operation indicating no interest, for example, a refusal operation or a shielding operation. Then, the media information immediately disappears from dynamics of the social user, such as a friend circle. A behavior attribute of the second-type interaction operation is the second behavior attribute. The second behavior attribute indicates that social users (the first user and the second user) are not interested in the media information. It can be seen that, the behavior attribute that characterizes the first-type interaction operation is contrary to the behavior attribute that characterizes the second-type interaction operation. In addition, the third parameter is an estimated parameter. For a specific estimation manner, refer to the other method embodiments.

In this embodiment, the third parameter is obtained according to a ratio of negative feedback of a social user on media information and the corresponding third conversion coefficient. Specifically, the ratio of negative feedback of a social user on media information is expressed as ENFBR(u,ad) that represents a ratio of negative feedback of the social user u on the media information ad. The third conversion coefficient is expressed as $bid_{xout}(u,ad)$ that represents a value of a penalty for the social user u being not interested in the media information ad. Then, the third parameter is:

$-bid_{xout}(u, ad) \times ENFBR(u, ad)$

Step 308: Obtain, according to the first parameter, the second parameter, and the third parameter of each media information, a fourth parameter that is of each media information and that is used for characterizing a presentation index of the media information.

In this embodiment, the fourth parameter is used for characterizing the presentation index of the media information. Calculation of the fourth parameter relates to the first parameter, the second parameter, and the third parameter. It can be seen that, by means of the fourth parameter, the value of the media information placement user, the interaction experience of the social user on the media information, and the loss of the social platform image value are comprehensively considered, and then the presentation sequence of each media information is determined.

In this embodiment, the fourth parameter is expressed as Value(u,ad). Then, $$\text{Value}(u,ad) = ECPM(u,ad) + w_e(u) \times EE(u,ad) - \text{bid}_{xout}(u,ad) \times ENFBR(u,ad) + w_s(u) \times \text{social\_}E(u,ad)$$

Step 309: Determine a presentation sequence of each media information according to the fourth parameter of each media information.

In this embodiment, a value of the fourth parameter is related to the presentation sequence of each media information. Specifically, a larger fourth parameter indicates a higher presentation sequence of media information. On the contrary, a smaller fourth parameter indicates a lower presentation sequence of media information. The presentation sequence of the media information determines a presentation position of the media information. A higher presentation sequence indicates a more visible presentation position. Setting of a presentation position is flexibly adjusted according to a specific website page. When media information is located at a visible location of the presentation position, a social user is easier to pay attention to the media information.

In the embodiments, the presentation sequence of each media information is determined by comprehensively considering the value of the media information placement user, the interaction experience of the social user on the media information, and the loss of the social platform image value.

The conversion coefficient in this embodiment may be determined in multiple manners. The following introduces an empirical value manner for determining the conversion coefficient. A specific conversion coefficient needs to be further adjusted according to service development and a media information ecology adjustment direction.

For the first conversion coefficient $w_e(u)$, statistics on a total quantity of clicking times and total costs of all social users within a period of time may be collected based on historical data of media information placement. For example, a total E value of all clicking (avatar, nickname, picture, and link) is A, and total overheads are B, then it can be obtained through calculation that a cash value of a unit E value is B/A. In addition, personalized values may be set for different social users by using $w_e(u)$. For example, a $w_e(u)$ value may be appropriately increased for a social user who does not like media information.

For the second conversion coefficient $w_s(u)$, fine tuning may be performed by using $w_e(u)$ as a basis.

For the third conversion coefficient $\text{bid}_{xout}(u,ad)$, an average media information value of each social user every year may be used as a basis. In addition, a penalty value of a social user who often does not like media information may be fine tuned.

Embodiment 4

Figure 4:
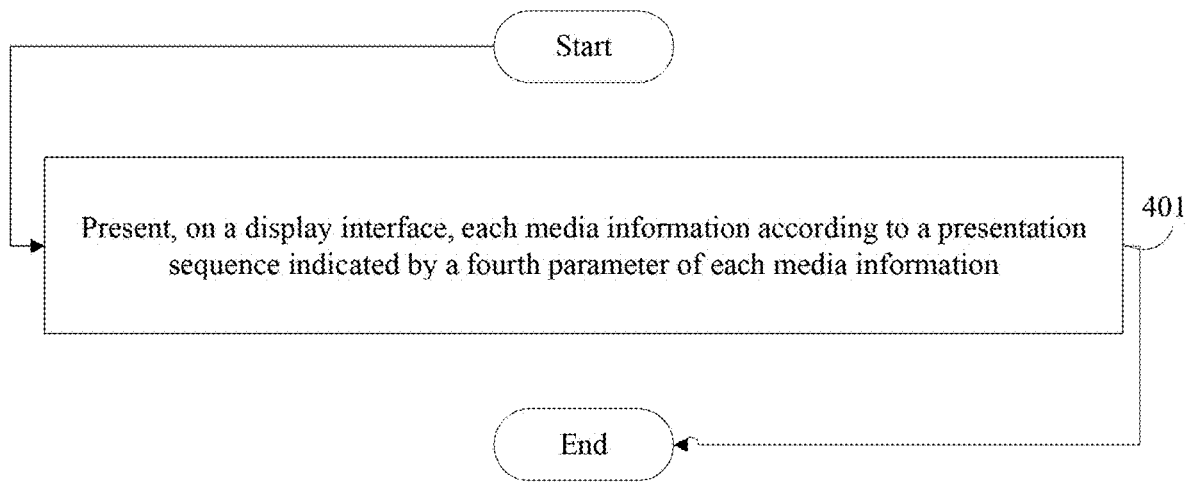
FIG. 4 is a schematic flowchart of a media information presentation method according to Embodiment 4.

An embodiment provides a media information presentation method. The media information presentation method in this example is applied to a client side. As shown in FIG. 4, the media information presentation method includes the following steps.

Step 401: Present, on a display interface, each media information according to a presentation sequence indicated by a fourth parameter of each media information.

The fourth parameter is obtained according to a first parameter, a second parameter, and a third parameter. The first parameter is used for characterizing that a preset quantity of times of presenting the media information is associated, the second parameter is used for characterizing that a first-type interaction operation on the media information is associated, the third parameter is used for characterizing that a second-type interaction operation on the media information is associated, and a behavior attribute that characterizes the first-type interaction operation is contrary to a behavior attribute that characterizes the second-type interaction operation.

This embodiment applies to a client side. Media information presented by a client is sorted by a server according to a presentation sequence indicated by a fourth parameter. The presentation sequence of the media information is not only related to a value of a media information placement user, but also related to interaction experience of a social user on the media information and a loss of a social platform image value. Therefore, media information presented according to the presentation sequence in this embodiment is more accurate for a user.

Embodiment 5

Figure 5:
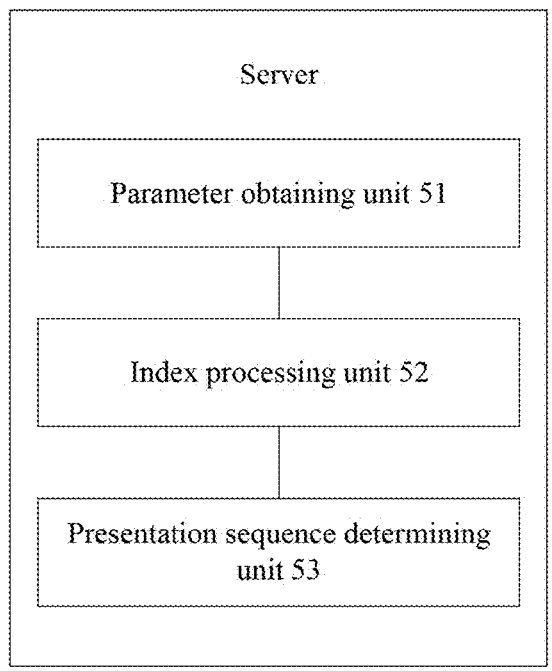
FIG. 5 is a schematic structural composition diagram of a server according to Embodiment 5.

An embodiment provides a server. As shown in FIG. 5, the server includes:

a parameter obtaining unit 51, configured to obtain a first parameter, a second parameter, and a third parameter of each media information, where the first parameter is used for characterizing that a preset quantity of times of presenting the media information is associated, the second parameter is used for characterizing that a first-type interaction operation on the media information is associated, the third parameter is used for characterizing that a second-type interaction operation on the media information is associated, and a behavior attribute that characterizes the first-type interaction operation is contrary to a behavior attribute that characterizes the second-type interaction operation;

an index processing unit 52, configured to obtain, according to the first parameter, the second parameter, and the third parameter of each media information, a fourth parameter that is of each media information and that is used for characterizing a presentation index of the media information; and a presentation sequence determining unit 53, configured to determine a presentation sequence of each media information according to the fourth parameter of each media information.

A person skilled in the art should understand that, functions implemented by units in the server shown in FIG. 5 may be understood by referring to the related description about the media information presentation method. The functions of the units in the server shown in FIG. 5 may be implemented by using a program that runs in a processor, or may be implemented by using a specific logic circuit.

Embodiment 6

Figure 6:
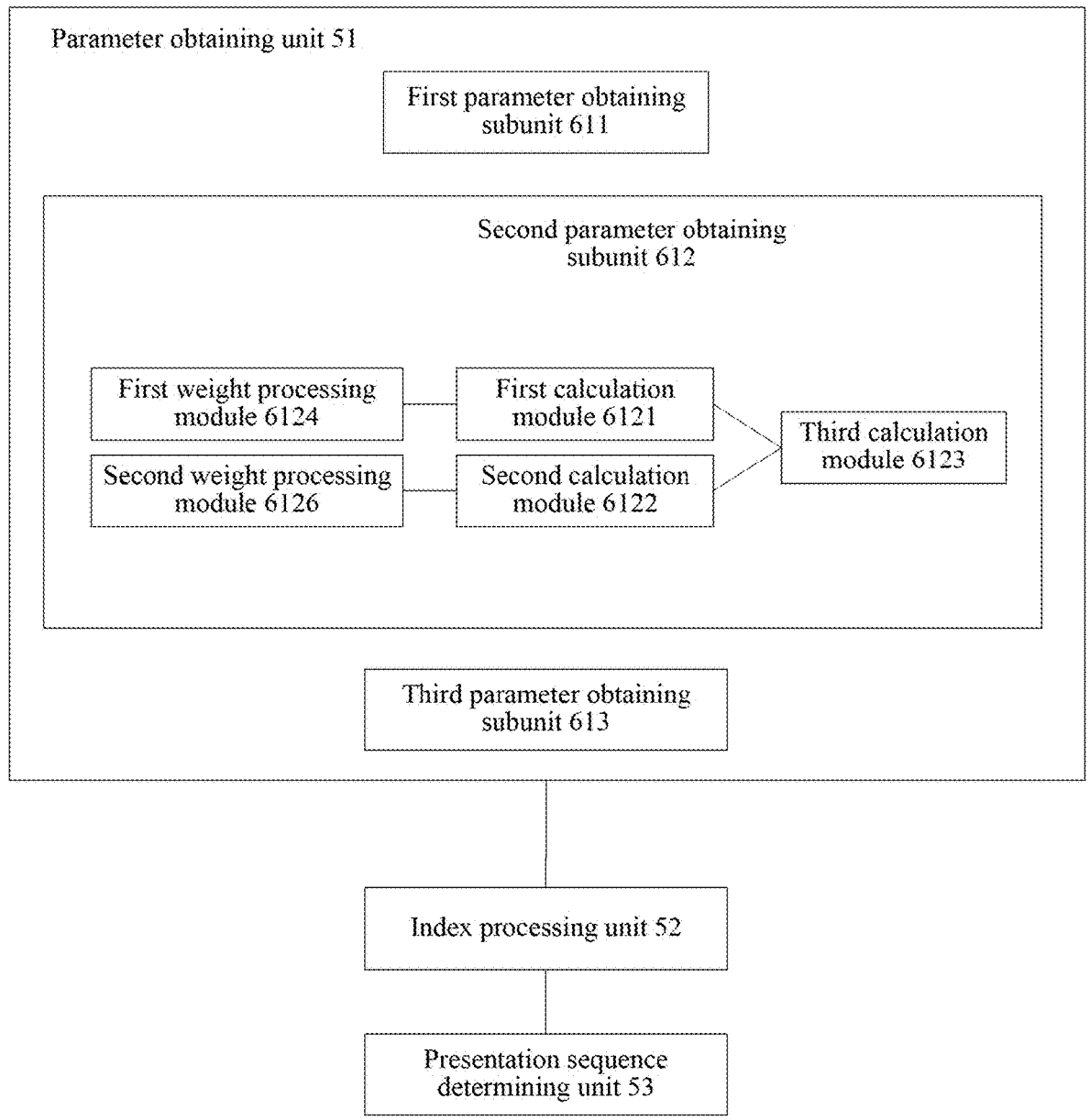
FIG. 6 is a schematic structural composition diagram of a server according to Embodiment 6.

An embodiment provides a server. As shown in FIG. 6, the server includes:

a parameter obtaining unit 61, configured to obtain a first parameter, a second parameter, and a third parameter of each media information, where the first parameter is used for characterizing that a preset quantity of times of presenting the media information is associated, the second parameter is used for characterizing that a first-type interaction operation on the media information is associated, the third parameter is used for characterizing that a second-type interaction operation on the media information is associated, and a behavior attribute that characterizes the first-type interaction operation is contrary to a behavior attribute that characterizes the second-type interaction operation;

an index processing unit 62, configured to obtain, according to the first parameter, the second parameter, and the third parameter of each media information, a fourth parameter that is of each media information and that is used for characterizing a presentation index of the media information; and a presentation sequence determining unit 63, configured to determine a presentation sequence of each media information according to the fourth parameter of each media information.

The first-type interaction operation on the media information includes: more than one interaction operation performed on the media information by a first user, and more than one interaction operation performed on the media information by a second user associated with the first user.

The parameter obtaining unit 61 includes:

a first parameter obtaining subunit 611, configured to obtain a first parameter that is of each media information and that is used for characterizing that a preset quantity of times of presenting the media information is associated;

a second parameter obtaining subunit 612, configured to obtain the second parameter used for characterizing that a first-type interaction operation on the media information is associated; and a third parameter obtaining subunit 613, configured to obtain the third parameter used for characterizing that a second-type interaction operation on the media information is associated; and the second parameter obtaining subunit 612 includes:

a first calculation module 6121, configured to: obtain, according to an interaction probability of each interaction operation performed on the media information by the first user and a corresponding interaction weight, a first interaction value that is of the first user and that is for the media information; and obtain, according to the first interaction value and a first conversion coefficient, a first sub-parameter associated with the first interaction value;

a second calculation module 6122, configured to: obtain, according to an interaction probability that is of the second user associated with the first user and that is for the media information and a corresponding interaction weight, a second interaction value that is of the second user and that is for the media information; and obtain, according to the second interaction value and a second conversion coefficient, a second sub-parameter associated with the second interaction value; and a third calculation module 6123, configured to obtain the second parameter according to the first sub-parameter and the second sub-parameter.

The second parameter obtaining subunit 612 further includes:

a first weight processing module 6124, configured to: collect statistics on an interaction frequency that is within preset duration and that is of each interaction operation performed on the media information by a first user; set an interaction weight of an interaction operation whose interaction frequency is the highest to a pre-specified value; and obtain, according to a rule that an interaction weight of each interaction operation is inversely proportional to the interaction frequency of each interaction operation, the interaction weight of each interaction operation in the more than one interaction operation.

The second parameter obtaining subunit 612 further includes:

a second weight processing module 6126, configured to obtain, according to an association value that characterizes a degree of association between the second user and the first user and an attribute value that characterizes authority of the second user, an interaction weight corresponding to the interaction operation performed on the media information by the second user.

The third parameter obtaining subunit 613 is further configured to: determine a negative feedback ratio of the media information according to the second-type interaction operation; and obtain the third parameter according to the negative feedback ratio of the media information and a corresponding third conversion coefficient.

A person skilled in the art should understand that, functions of units in the server shown in FIG. 6 may be understood by referring to the related description about the media information presentation method. The functions of the units in the server shown in FIG. 6 may be implemented by using a program that runs in a processor, or may be implemented by using a specific logic circuit.

Embodiment 7

Figure 7:
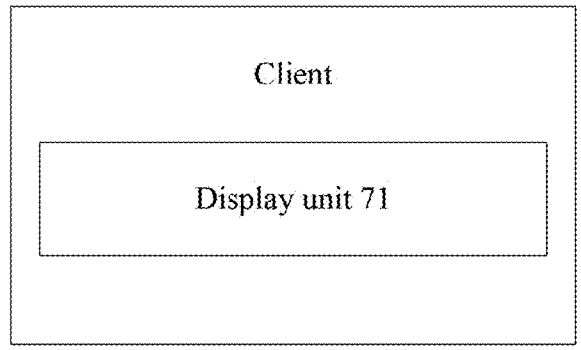
FIG. 7 is a schematic diagram of a client according to Embodiment 7.

An embodiment provides a client. As shown in FIG. 7, the client includes:

a display unit 71, configured to present, on a display interface, each media information according to a presentation sequence indicated by a fourth parameter of each media information, where the fourth parameter is obtained according to a first parameter, a second parameter, and a third parameter. The first parameter is used for characterizing that a preset quantity of times of presenting the media information is associated, the second parameter is used for characterizing that a first-type interaction operation on the media information is associated, the third parameter is used for characterizing that a second-type interaction operation on the media information is associated, and a behavior attribute that characterizes the first-type interaction operation is contrary to a behavior attribute that characterizes the second-type interaction operation.

Embodiment 8

Figure 8:
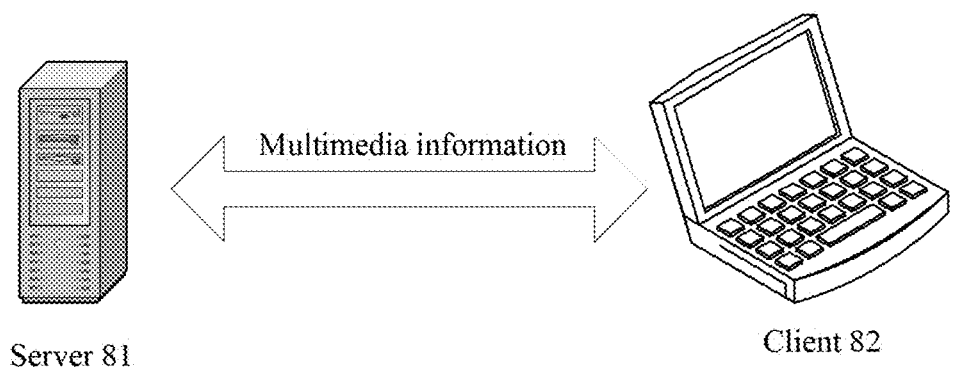
FIG. 8 is a schematic diagram of a media information presentation system according to Embodiment 8.

An embodiment provides a media information presentation system. As shown in FIG. 8, the system includes:

a server 81, configured to: obtain a first parameter, a second parameter, and a third parameter of each media information, where the first parameter is used for characterizing that a preset quantity of times of presenting the media information is associated, the second parameter is used for characterizing that a first-type interaction operation on the media information is associated, the third parameter is used for characterizing that a second-type interaction operation on the media information is associated, and a behavior attribute that characterizes the first-type interaction operation is contrary to a behavior attribute that characterizes the second-type interaction operation; obtain, according to the first parameter, the second parameter, and the third parameter of each media information, a fourth parameter that is of each media information and that is used for characterizing a presentation index of the media information; and determine a presentation sequence of each media information according to the fourth parameter of each media information; and a client 82, configured to present, on a display interface, each media information according to a presentation sequence indicated by a fourth parameter of each media information, where the fourth parameter is obtained according to a first parameter, a second parameter, and a third parameter, the first parameter is used for characterizing that a preset quantity of times of presenting the media information is associated, the second parameter is used for characterizing that a first-type interaction operation on the media information is associated, the third parameter is used for characterizing that a second-type interaction operation on the media information is associated, and a behavior attribute that characterizes the first-type interaction operation is contrary to a behavior attribute that characterizes the second-type interaction operation.

Embodiment 9

Figure 9:
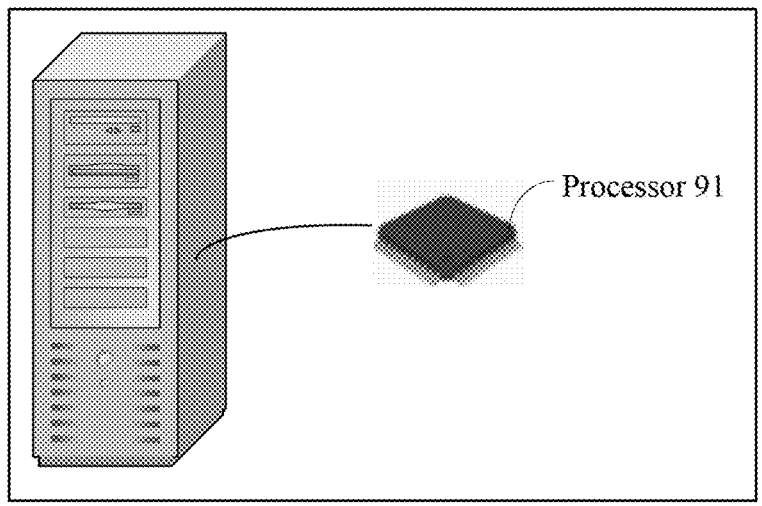
FIG. 9 is a schematic diagram of a hardware entity of a server according to Embodiment 9.

An embodiment provides a server. As shown in FIG. 9, the server includes:

a processor 91, configured to perform the following operations by using executable instructions: obtaining a first parameter, a second parameter, and a third parameter of each media information, where the first parameter is used for characterizing that a preset quantity of times of presenting the media information is associated, the second parameter is used for characterizing that a first-type interaction operation on the media information is associated, the third parameter is used for characterizing that a second-type interaction operation on the media information is associated, and a behavior attribute that characterizes the first-type interaction operation is contrary to a behavior attribute that characterizes the second-type interaction operation; obtaining, according to the first parameter, the second parameter, and the third parameter of each media information, a fourth parameter that is of each media information and that is used for characterizing a presentation index of the media information; and determining a presentation sequence of each media information according to the fourth parameter of each media information.

The first-type interaction operation on the media information includes: more than one interaction operation performed on the media information by a first user, and more than one interaction operation performed on the media information by a second user associated with the first user.

The processor 91 is further configured to perform the following operations by using executable instructions: obtaining or determining a first parameter that is of each media information and that is used for characterizing that a preset quantity of times of presenting the media information is associated; obtaining or determining the second parameter used for characterizing that a first-type interaction operation on the media information is associated; and determining or obtaining the third parameter used for characterizing that a second-type interaction operation on the media information is associated.

The processor 91 is further configured to perform the following operations by using executable instructions: obtaining, according to an interaction probability of each interaction operation performed on the media information by the first user and a corresponding interaction weight, a first interaction value that is of the first user and that is for the media information; obtaining, according to the first interaction value and a first conversion coefficient, a first sub-parameter associated with the first interaction value; obtaining, according to an interaction probability that is of the second user associated with the first user and that is for the media information and a corresponding interaction weight, a second interaction value that is of the second user and that is for the media information; obtaining, according to the second interaction value and a second conversion coefficient, a second sub-parameter associated with the second interaction value; and obtaining the second parameter according to the first sub-parameter and the second sub-parameter.

The processor 91 is further configured to perform the following operations by using executable instructions: collecting statistics on an interaction frequency that is within preset duration and that is of each interaction operation performed on the media information by a first user; setting an interaction weight of an interaction operation whose interaction frequency is the highest to a pre-specified value; and obtaining, according to a rule that an interaction weight of each interaction operation is inversely proportional to the interaction frequency of each interaction operation, the interaction weight of each interaction operation in the more than one interaction operation. Alternatively or in addition, the processor 91 may be further configured to Determining respective interaction frequencies of the interaction operations performed within a predetermined time period. The processor may identify a greatest interaction frequency of the respective interaction frequencies. The processor may calculate, according to a rule, a plurality of interaction weights, wherein one of the interaction weights comprises a predetermined value, the one of the interaction weights corresponding to an interaction operation association with the greatest interaction frequency, wherein a remainder of the plurality of interaction weights are inversely proportional to the predetermined value. The processor may weigh, according to the interaction weights, a plurality of interaction probabilities corresponding to the interaction operations.

The processor 91 is further configured to perform the following operations by using executable instructions: determining a negative feedback ratio of the media information according to the second-type interaction operation; and obtaining the third parameter according to the negative feedback ratio of the media information and a corresponding third conversion coefficient.

The processor 91 is further configured to perform the following operation by using an executable instruction: obtaining, according to an association value that characterizes a degree of association between the second user and the first user and an attribute value that characterizes authority of the second user, an interaction weight corresponding to the interaction operation performed on the media information by the second user.

The processor 91 may be one or more devices operable to execute logic. The logic may include computer executable instructions or computer code embodied in a memory or in other memory that when executed by the processor 91, cause the processor 91 to perform the features implemented by the logic of the modules and/or methods described herein including, for example, parameter obtaining unit 51, the index processing unit 52, the presentation sequencing determining unit 53, or any other unit described herein. The computer code may include instructions executable with the processor 91.

The memory may be any device for storing and retrieving data or any combination thereof. The 820 may include non-volatile and/or volatile memory, such as a random access memory (RAM), a read-only memory (ROM), an erasable programmable read-only memory (EPROM), or flash memory. Alternatively or in addition, the memory may include an optical, magnetic (hard-drive) or any other form of data storage device. The memory may include at least one of the parameter obtaining unit 51, the index processing unit 52, the presentation sequencing determining unit 53, or any other sub-unit thereof.

The server may be implemented in many different ways. Each module described herein may be hardware or a combination of hardware and software. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of the memory, for example, that comprises instructions executable with the processor 91 or other processor to implement one or more of the features of the module. When any one of the module includes the portion of the memory that comprises instructions executable with the processor, the module may or may not include the processor. In some examples, each module may just be the portion of the memory or other physical memory that comprises instructions executable with the processor or other processor to implement the features of the corresponding module without the module including any other hardware. Because each module includes at least some hardware even when the included hardware comprises software, each module may be interchangeably referred to as a hardware module.

Some features are shown stored in a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable storage medium, such as a CD-ROM, a volatile memory, a non-volatile memory, ROM, RAM, or any other suitable storage device.

Embodiment 10

Figure 10:
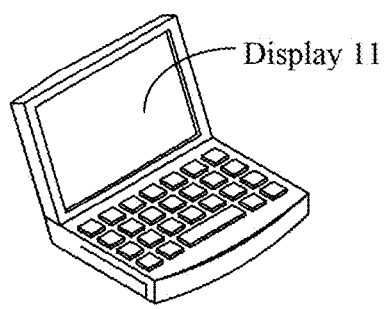
FIG. 10 is a schematic diagram of a hardware entity of a client according to Embodiment 10.

An embodiment provides a client. As shown in FIG. 10, the client includes:

a display 11, configured to present, on a display interface, each media information according to a presentation sequence indicated by a fourth parameter of each media information, where the fourth parameter is obtained according to a first parameter, a second parameter, and a third parameter. The first parameter is used for characterizing that a preset quantity of times of presenting the media information is associated, the second parameter is used for characterizing that a first-type interaction operation on the media information is associated, the third parameter is used for characterizing that a second-type interaction operation on the media information is associated, and a behavior attribute that characterizes the first-type interaction operation is contrary to a behavior attribute that characterizes the second-type interaction operation.

When an integrated module in this embodiment is implemented in a form of a module and sold or used as an independent product, the integrated module may alternatively be stored in a computer-readable storage medium. Based on such an understanding, a person skilled in the art should understand that the embodiments of this application may be provided as a method, a system, or a system that implements the method. Therefore, this application may use a form of hardware embodiments and/or embodiments with a combination of software and hardware. In addition, this application may use a form of a computer program product that is implemented on one or more computer-usable storage media that include computer-usable program code. The storage media include but are not limited to a USB disk, a removable hard disk, a read-only memory (ROM, Read-Only Memory), a random access memory (RAM, Random Access Memory), a magnetic disk memory, a CD-ROM, an optical memory, and the like.

This application is described according to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may alternatively be stored in a computer readable memory that can guide a computer or another programmable data processing device to work in a specific manner, so that the instructions stored in the computer readable memory generate a product including an instruction apparatus, where the instruction apparatus implements functions specified in one or more processes in the flowcharts and/or one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of this application have been described, persons skilled in the art can make changes and modifications to these embodiments once they learn the basic inventive concept. Therefore, the following claims are intended to be construed as to cover the preferred embodiments and all changes and modifications falling within the scope of this application.

Correspondingly, an embodiment further provides a computer storage medium in which a computer program is stored. The computer program is used for executing the media information presentation method in the embodiments.

In the several embodiments provided in this application, it should be understood that the disclosed device and method may be implemented in other manners. The described device embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections between various components may be implemented through some interfaces. The indirect couplings or communication connections between the apparatuses or units may be implemented in electronic, mechanical, or other forms.

Units described as separate components may be or may not be physically separated. Components shown as units may be or may not be physical units, that is, may be integrated or distributed to multiple network units. Some or all of the units may be selected according to an actual need, to implement objectives of the solutions in the embodiments.

In addition, the functional units in the embodiments may be all integrated into one processing unit, or each of the units may be separately used as one unit, or two or more of the units may be integrated into one unit. The integrated unit may be implemented in a form of hardware, or may be implemented in a form of hardware in addition to a software functional unit.

A person of ordinary skill in the art may understand that, all or a part of the processes of the foregoing method embodiments may be implemented by a computer program instructing relevant hardware. The foregoing program may be stored in a computer readable storage medium. When the program runs, the steps of the foregoing method embodiments are performed. The foregoing storage medium may include any medium capable of storing program code, such as a mobile storage device, a read-only memory (ROM, Read-Only Memory), a random access memory (RAM, Random Access Memory), a magnetic disk, or an optical disc.

When the integrated unit of the present disclosure is implemented in the form of a software functional module and sold or used as an independent product, the integrated unit may be stored in a computer-readable storage medium. Based on such an understanding, the technical solutions in the embodiments essentially, or a part contributing to the existing technology may be implemented in a form of a software product. The software product is stored in a storage medium, and includes several instructions for instructing a computer device (which may be a personal computer, a server, or a network device) to perform all or some of the methods in the embodiments. The foregoing storage medium includes: any medium that can store program code, such as a mobile storage device, a read-only memory (ROM, Read-Only Memory), a random access memory (RAM, Random Access Memory), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

The subject-matter of the disclosure may also relate, among others, to the following aspects:

1. A media information presentation method, the method comprising:

obtaining a first parameter, a second parameter, and a third parameter of each media information, the first parameter being used for characterizing that a preset quantity of times of presenting the media information is associated, the second parameter being used for characterizing that a first-type interaction operation on the media information is associated, the third parameter being used for characterizing that a second-type interaction operation on the media information is associated, and a behavior attribute that characterizes the first-type interaction operation being contrary to a behavior attribute that characterizes the second-type interaction operation;

obtaining, according to the first parameter, the second parameter, and the third parameter of each media information, a fourth parameter that is of each media information and that is used for characterizing a presentation index of the media information; and determining a presentation sequence of each media information according to the fourth parameter of each media information.

2. The media information presentation method according to aspect 1, wherein the first-type interaction operation on the media information comprises: more than one interaction operation performed on the media information by a first user, and more than one interaction operation performed on the media information by a second user associated with the first user.

3. The media information presentation method according to aspect 2, wherein the obtaining the second parameter being used for characterizing that a first-type interaction operation on the media information is associated comprises:

obtaining, according to an interaction probability of each interaction operation performed on the media information by the first user and a corresponding interaction weight, a first interaction value that is of the first user and that is for the media information; and obtaining, according to the first interaction value and a first conversion coefficient, a first sub-parameter associated with the first interaction value;

obtaining, according to an interaction probability that is of the second user associated with the first user and that is for the media information and a corresponding interaction weight, a second interaction value that is of the second user and that is for the media information; and obtaining, according to the second interaction value and a second conversion coefficient, a second sub-parameter associated with the second interaction value; and obtaining the second parameter according to the first sub-parameter and the second sub-parameter.

4. The media information presentation method according to aspect 3, wherein the method further comprises:

collecting statistics on an interaction frequency that is within preset duration and that is of each interaction operation performed on the media information by the first user;

setting an interaction weight of an interaction operation whose interaction frequency is the highest to a pre-specified value; and obtaining, according to a rule that an interaction weight of each interaction operation is inversely proportional to the interaction frequency of each interaction operation, the interaction weight of each interaction operation in the more than one interaction operation.

5. The media information presentation method according to aspect 1, wherein the obtaining the third parameter being used for characterizing that a second-type interaction operation on the media information is associated comprises:

determining a negative feedback ratio of the media information according to the second-type interaction operation; and obtaining the third parameter according to the negative feedback ratio of the media information and a corresponding third conversion coefficient.

6. The media information presentation method according to aspect 3, wherein the method further comprises:

obtaining, according to an association value that characterizes a degree of association between the second user and the first user and an attribute value that characterizes authority of the second user, an interaction weight corresponding to the interaction operation performed on the media information by the second user.

7. A media information presentation method, the method comprising:

presenting, on a display interface, each media information according to a presentation sequence indicated by a fourth parameter of each media information, wherein the fourth parameter is obtained according to a first parameter, a second parameter, and a third parameter, the first parameter being used for characterizing that a preset quantity of times of presenting the media information is associated, the second parameter being used for characterizing that a first-type interaction operation on the media information is associated, the third parameter being used for characterizing that a second-type interaction operation on the media information is associated, and a behavior attribute that characterizes the first-type interaction operation being contrary to a behavior attribute that characterizes the second-type interaction operation.

8. A server, the server comprising:

a processor, configured to perform the following operations by using executable instructions: obtaining a first parameter, a second parameter, and a third parameter of each media information, the first parameter being used for characterizing that a preset quantity of times of presenting the media information is associated, the second parameter being used for characterizing that a first-type interaction operation on the media information is associated, the third parameter being used for characterizing that a second-type interaction operation on the media information is associated, and a behavior attribute that characterizes the first-type interaction operation being contrary to a behavior attribute that characterizes the second-type interaction operation; obtaining, according to the first parameter, the second parameter, and the third parameter of each media information, a fourth parameter that is of each media information and that is used for characterizing a presentation index of the media information; and determining a presentation sequence of each media information according to the fourth parameter of each media information.

9. The server according to aspect 8, wherein the first-type interaction operation on the media information comprises: more than one interaction operation performed on the media information by a first user, and more than one interaction operation performed on the media information by a second user associated with the first user.

10. The server according to aspect 9, wherein the processor is further configured to perform the following operations by using executable instructions: obtaining a first parameter that is of each media information and that is used for characterizing that a preset quantity of times of presenting the media information is associated; obtaining the second parameter used for characterizing that a first-type interaction operation on the media information is associated; and obtaining the third parameter used for characterizing that a second-type interaction operation on the media information is associated, wherein the processor is further configured to perform the following operations by using executable instructions: obtaining, according to an interaction probability of each interaction operation performed on the media information by the first user and a corresponding interaction weight, a first interaction value that is of the first user and that is for the media information; obtaining, according to the first interaction value and a first conversion coefficient, a first sub-parameter associated with the first interaction value; obtaining, according to an interaction probability that is of the second user associated with the first user and that is for the media information and a corresponding interaction weight, a second interaction value that is of the second user and that is for the media information; obtaining, according to the second interaction value and a second conversion coefficient, a second sub-parameter associated with the second interaction value; and obtaining the second parameter according to the first sub-parameter and the second sub-parameter.

11. The server according to aspect 10, wherein the processor is further configured to perform the following operations by using executable instructions: collecting statistics on an interaction frequency that is within preset duration and that is of each interaction operation performed on the media information by the first user; setting an interaction weight of an interaction operation whose interaction frequency is the highest to a pre-specified value; and obtaining, according to a rule that an interaction weight of each interaction operation is inversely proportional to the interaction frequency of each interaction operation, the interaction weight of each interaction operation in the more than one interaction operation.

12. The server according to aspect 10, wherein the processor is further configured to perform the following operations by using executable instructions: determining a negative feedback ratio of the media information according to the second-type interaction operation; and obtaining the third parameter according to the negative feedback ratio of the media information and a corresponding third conversion coefficient.

13. The server according to aspect 10, wherein the processor is further configured to perform the following operation by using an executable instruction: obtaining, according to an association value that characterizes a degree of association between the second user and the first user and an attribute value that characterizes authority of the second user, an interaction weight corresponding to the interaction operation performed on the media information by the second user.

14. A client, the client comprising:

a display, configured to present, on a display interface, each media information according to a presentation sequence indicated by a fourth parameter of each media information, wherein the fourth parameter is obtained according to a first parameter, a second parameter, and a third parameter, the first parameter being used for characterizing that a preset quantity of times of presenting the media information is associated, the second parameter being used for characterizing that a first-type interaction operation on the media information is associated, the third parameter being used for characterizing that a second-type interaction operation on the media information is associated, and a behavior attribute that characterizes the first-type interaction operation being contrary to a behavior attribute that characterizes the second-type interaction operation.

15. A computer storage medium, a computer executable instruction being stored in the computer storage medium, and the computer executable instruction being configured to execute the media information presentation method according to aspect 1.

What is claimed is:

1. A method, comprising:
    determining a first placement metric corresponding to a media object of a plurality of media objects, the first placement metric based on a predetermined number of times a media object is displayed;
    determining a second placement metric corresponding to the media object, the second placement metric based on a first-type interaction operation with the media object, the first-type interaction operation associated with a positive feedback attribute wherein determining the second placement metric comprises:
        determining a first interaction weight that is inversely proportional to a frequency of the first-type interaction operation for a first account,
        determining a second interaction weight that is proportional to a degree of association between the first account and a second account, the first account being linked with the second account, and
        generating the second placement metric based on a weighted combination of the first interaction weight and the second interaction weight, wherein in the second placement metric is inversely proportional to the frequency of the first-type interaction operation associated for and proportional to a degree of association between the first account and the second account;
    determining a third placement metric corresponding to the media object, the third placement metric based on a second-type interaction operation with the media object, the second-type interaction operation associated with a negative feedback attribute;
    determining a presentation index corresponding to the media object, the presentation index referencing a position in a presentation sequence, the presentation sequence describing a sequential order in which to display the media objects, the presentation index comprising a weighted combination of the first placement metric, the second placement metric, and the third placement metric; and
    communicating, to a display interface, an instruction to display the media objects according to the presentation sequence.

2. The method of claim 1, wherein generating the second placement metric based on a weighted combination of the first interaction weight and the second interaction weight comprises
    generating a weighted interaction parameter based on application of the first interaction weight to a first interaction probability of a first interaction operation performed on the media object by the first account; and
    generating a weighted association parameter based on application of the second interaction weight to a second interaction probability of a second interaction operation performed on the media object by the second account and
    combining the weighted interaction parameter and the weighted association parameter to generate the second placement metric.

3. The method of claim 1, wherein the first-type interaction operation comprises a plurality of interaction operations, wherein the step of determining the second placement metric further comprises:
    determining respective interaction probabilities for the interaction operations,
    selecting respective interaction weights for the interaction operations;
    applying the respective interaction weights with the respective interaction probabilities to determine a plurality of weighted interaction probabilities;
    combining the weighted interaction probabilities to generate an interaction value; and
    weighting the interaction value with a first conversion coefficient to generate the second placement metric.

4. The method of claim 1, wherein the first-type interaction operation comprises a plurality of interaction operations, the step of determining the second placement metric further comprising:
    determining respective interaction frequencies of the interaction operations performed within a predetermined time period;
    identifying a greatest interaction frequency of the respective interaction frequencies;
    calculating, according to a rule, a plurality of interaction weights, wherein one of the interaction weights comprises a predetermined value, the one of the interaction weights corresponding to an interaction operation association with the greatest interaction frequency, wherein a remainder of the plurality of interaction weights are inversely proportional to the predetermined value; and
    weighting, according to the interaction weights, a plurality of interaction probabilities corresponding to the interaction operations.

5. The method of to claim 1, wherein the step of determining the third placement metric further comprises:
    determining a negative feedback ratio corresponding to the media object according to the second-type interaction operation; and
    determining the third placement metric based on the negative feedback ratio and a conversion coefficient.

6. The method of claim 1, wherein, the first-type interaction operation is associated with the first account, the step of determining the second placement metric further comprises:
    calculating, according to a rule associated with the first-type interaction operation, the second interaction weight corresponding to the first-type interaction operation, the second interaction weight based on an amount of interaction between the first account and the second account; and
    weighting, with the second interaction weight, an interaction probability corresponding to the first-type interaction operation.

7. The method of claim 1, further comprising displaying, on a display interface, the media objects according to the presentation sequence.

8. A system comprising a processor, the processor configured to:
    determine a first placement parameter corresponding to a media object of a plurality of media objects displayed according to a presentation sequence, the first placement parameter based on a predetermined quantity of times a media object is displayed;

determine a second placement parameter corresponding to the media object, the second placement parameter based on a positive feedback interaction operation associated with the media object wherein to determine the second placement parameter is based on:
    determination of a first interaction weight that is inversely proportional to a frequency of the positive feedback interaction operation for a first account,
    determination of a second interaction weight that is proportional to a degree of association between the first account and a second account, the first account being linked with the second account, and
    generation of the second placement parameter based on a weighted combination of the first interaction weight and the second interaction weight, wherein in the second placement parameter is inversely proportional to the frequency of the positive feedback interaction operation associated for and proportional to a degree of association between the first account and the second account;
determine a third placement parameter corresponding to the media object, the third placement parameter based on a negative feedback interaction operation associated with the media object;
determine a presentation index corresponding to the media object, the presentation index referencing a position in the presentation sequence, the presentation index comprising a combination of the first placement parameter, the second placement parameter, and the third placement parameter; and
communicate, to a display interface, an instruction to display the media objects according to the presentation sequence.

9. The system of claim 8, wherein the positive feedback interaction operation comprises a first interaction operation performed on the media object and a second interaction operation performed on the media object.

10. The system of claim 8, wherein the positive feedback interaction operation comprises a plurality of interaction operations, and wherein to determine the second placement parameter, the processor is further configured to:
    determine respective interaction probabilities for each of the interaction operations,
    select respective interaction weights for each of the interaction operations;
    apply the respective interaction weights with the respective interaction probabilities to determine a plurality of weighted interaction probabilities;
    combine the weighted interaction probabilities to generate an interaction value; and
    weighting the interaction value with a first conversion coefficient to generate the second placement parameter.

11. The system of claim 8, wherein the positive feedback interaction operation comprises a plurality of interaction operations, wherein to determine the second placement parameter, the processor is further configured to:
    determine respective interaction frequencies of the interaction operations performed within a predetermined time period;
    identify a greatest interaction frequency of the respective interaction frequencies;
    calculate, according to a rule, a plurality of interaction weights, wherein one of the interaction weights comprises a predetermined value, the one of the interaction weights corresponding to an interaction operation association with the greatest interaction frequency, wherein a remainder of the plurality of interaction weights are inversely proportional to the predetermined value; and
    apply the interaction weights to a plurality of interaction probabilities corresponding to the interaction operations.

12. The system of to claim 8, wherein to determine the third placement parameter, the processor is further configured to:
    determine a negative feedback ratio of the media object according to the negative feedback interaction operation; and
    determine the third placement parameter, based on the negative feedback ratio and a conversion coefficient.

13. The system of claim 8, wherein to determine the second placement parameter, the processor is further configured to:
    calculate, according to a rule, second interaction weight corresponding to the positive feedback interaction operation, the positive feedback interaction operation performed under a first account, the second interaction weight based an amount of interaction between the first account and the second account; and
    apply the second interaction weight to an interaction probability corresponding to the positive feedback interaction operation.

14. The system of claim 8, wherein the processor is further configured to display, on a display interface, the media objects according to the presentation sequence.

15. A non-transitory computer readable storage medium comprising a plurality of instructions executable by a processor, the instructions comprising:
    instructions executable by the processor to determine a first placement parameter corresponding to a media object of a plurality of media objects displayed according to a presentation sequence, the first placement parameter based on a predetermined quantity of times a media object is displayed;
    instructions executable by the processor to determine a second placement parameter corresponding to the media object, the second placement parameter based on a first-type interaction operation with the media object, the first-type interaction operation associated with a positive feedback attribute, wherein the instructions executable by the processor to determine the second placement parameter cause the processor to:
        determine a first interaction weight that is inversely proportional to a frequency of the first-type interaction operation for a first account,
        determine a second interaction weight that is proportional to a degree of association between the first account and a second account, the first account being linked with the second account, and
        generate the second placement parameter based on a weighted combination of the first interaction weight and the second interaction weight, wherein in the second placement parameter is inversely proportional to the frequency of the first type interaction associated for and proportional to a degree of association between the first account and the second account;
    instructions executable by the processor to determine a third placement parameter corresponding to the media object, the third placement parameter based on a second-type interaction operation with the media object, the second-type interaction operation associated with a negative feedback attribute;

instructions executable by the processor to determine a presentation index corresponding to the media object, the presentation index referencing a position in the presentation sequence, the presentation index comprising a weighted combination of the first placement parameter, the second placement parameter, and the third placement parameter; and instructions executable by the processor to communicate, to a display interface, an instruction to display the media objects according to the presentation sequence.

16. The non-transitory computer readable storage medium of claim 15, wherein the first-type interaction operation comprises a plurality of interaction operations, wherein the instructions executable by the processor to determine the second placement parameter further include:

instructions executable by the processor to determine respective interaction probabilities for each of the interaction operations, instructions executable by the processor to select respective interaction weights for each of the interaction operations;

instructions executable by the processor to apply the respective interaction weights with the respective interaction probabilities to determine a plurality of weighted interaction probabilities;

instructions executable by the processor to combine the weighted interaction probabilities to generate an interaction value; and instructions executable by the processor to weight the interaction value with a first conversion coefficient to generate the second placement parameter.

17. The non-transitory computer readable storage medium of claim 15, wherein the first-type interaction operation comprises a plurality of interaction operations, wherein the instructions executable by the processor to determine the second placement parameter further include:

instructions executable by the processor to determine respective interaction frequencies of the interaction operations performed within a predetermined time period;

instructions executable by the processor to identify a greatest interaction frequency of the respective interaction frequencies;

instructions executable by the processor to calculate, according to a rule, a plurality of interaction weights, wherein one of the interaction weights comprises a predetermined value, the one of the interaction weights corresponding to an interaction operation association with the greatest interaction frequency, wherein a remainder of the plurality of interaction weights are inversely proportional to the predetermined value; and instructions executable by the processor to apply the interaction weights to a plurality of interaction probabilities corresponding to the interaction operations.

18. The non-transitory computer readable storage medium of claim 15, wherein the instructions executable by the processor to determine the third placement parameter further include:

instructions executable by the processor to determine a negative feedback ratio of the media object according to the second-type interaction operation; and instructions executable by the processor to determine the third placement parameter, based on the negative feedback ratio and a conversion coefficient.

19. The non-transitory computer readable storage medium of claim 15, wherein the first-type interaction operation is associated with a first account, the instructions executable by the processor to determine the second placement parameter further include:

instructions executable by the processor to calculate, according to a rule, a second interaction weight corresponding to the first-type interaction operation, the second interaction weight based an amount of interaction between the first account and the second account; and instructions executable by the processor to apply the second interaction weight to an interaction probability corresponding to the first-type interaction operation.

20. The non-transitory computer readable storage medium of claim 15, further including:

instructions executable by the processor to display, on a display interface, the media objects according to the presentation sequence.

* * * * *